(12) United States Patent
Ishii

(10) Patent No.: US 8,351,148 B2
(45) Date of Patent: Jan. 8, 2013

(54) MAGNETIC TAPE LIBRARY DEVICE TO SAFELY EXTRACT MAGAZINES OF MAGNETIC TAPE CARTRIDGES

(75) Inventor: Hiroaki Ishii, Tokyo (JP)

(73) Assignee: NEC Corporation, Tokyo (JP)

( * ) Notice: Subject to any disclaimer, the term of this patent is extended or adjusted under 35 U.S.C. 154(b) by 363 days.

(21) Appl. No.: 12/765,035

(22) Filed: Apr. 22, 2010

(65) Prior Publication Data

US 2010/0270186 A1    Oct. 28, 2010

(30) Foreign Application Priority Data

Apr. 24, 2009    (JP) ................. 2009-106271

(51) Int. Cl.
*G11B 15/68* (2006.01)
(52) U.S. Cl. .................................. 360/92.1
(58) Field of Classification Search ............. 360/92.1; 369/30.39, 30.42, 30.53
See application file for complete search history.

(56) References Cited

U.S. PATENT DOCUMENTS

| | | | |
|---|---|---|---|
| 7,400,469 B2 * | 7/2008 | Starr et al. | 360/92.1 |
| 7,800,860 B2 * | 9/2010 | Steinhilber | 360/92.1 |

FOREIGN PATENT DOCUMENTS

| | | |
|---|---|---|
| DE | 10 2005 057 678 A1 | 6/2007 |
| DE | 602 22 045 T2 | 4/2008 |
| JP | 7-21725 A | 1/1995 |
| JP | 2003132606 A | 5/2003 |
| JP | 2008-275704 A | 11/2008 |

OTHER PUBLICATIONS

German Office Action for DE10 2010 028 108.5 mailed Feb. 17, 2012.
Japanese Office Action for JP2009-106271 mailed Apr. 19, 2011.

* cited by examiner

*Primary Examiner* — Allen Heinz

(57) ABSTRACT

To provide a magnetic tape library device with which a plurality of housed magazines can be extracted safely from the device with the same operation, while the device is made to be simple. The magnetic tape library device includes: a plurality of magazines for housing a plurality of magnetic tape cartridges inside thereof; a device main body for housing the magazines within a same plane in a freely movable manner and in series in an inserting/extracting direction from an inserting/extracting slot; a connecting mechanism for enabling the plurality of magazines to be connected with each other or to be released by a releasing operation from outside; and a locking mechanism for enabling at least the magazine on the back side of the inserting/extracting direction of the device main body, among the plurality of magazines, to be locked or to be released from the locked state at the inserting/extracting slot side.

8 Claims, 12 Drawing Sheets

MAGNETIC TAPE LIBRARY DEVICE TO SAFELY EXTRACT MAGAZINES OF MAGNETIC TAPE CARTRIDGES

CROSS-REFERENCE TO RELATED APPLICATION

This application is based upon and claims the benefit of priority from Japanese patent application No. 2009-106271, filed on Apr. 24, 2009, the disclosure of which is incorporated herein in its entirety by reference.

BACKGROUND OF THE INVENTION

1. Field of the Invention

The present invention relates to a magnetic tape library device. More specifically, the present invention relates to a magnetic tape library device with which a plurality of cartridge housing bodies having a plurality of magnetic tape cartridges housed therein and are placed in series within a horizontal plane can be easily pulled out to the outside the device from a housing state, and with which the cartridge housing body can be prevented from falling out of the device unexpectedly.

2. Description of the Related Art

There has been known a magnetic tape library device which includes, in a chassis, a plurality of cartridge housing bodies for housing a plurality of magnetic tape cartridges. With this type, there has been known a magnetic tape library device in which a cartridge housing body is placed movably within a horizontal plane along the inserting/extracting direction. As an example of such a magnetic tape library device, there is a type in which the cartridge housing body is divided in two pieces in the back and the front in the inserting/extracting direction (see Japanese Patent Application JP2008-275704 (Patent Document 1), for example).

A cartridge library device disclosed in Patent Document 1 is a magnetic tape library device with which a cartridge on the back side can be easily extracted without using a robot or the like. In the magnetic tape library device 100, a magazine 120 is divided to a front magazine (not shown in FIG. 12 because of being extracted already) disposed on the front side of an inserting/extracting direction X and a rear magazine 122 disposed on the back side of the inserting/extracting direction X while being placed adjacent to the front magazine. In order to pull out the rear magazine 122 disposed on the back side, a magazine slider 125 provided on one of side faces of a device main body 11 is pulled out in an extracting direction X2 along the inserting/extracting direction X.

Note that Patent Document 1 disclosing the magnetic tape library device 100 is an application filed by the Applicant of the present invention.

By the way, the magnetic tape library device disclosed in Patent Document 1 is an excellent invention with which: among a plurality of cartridges housed in series along the inserting/extracting direction, a cartridge on the back side can be easily extracted without using a robot or the like.

However, Applicant of the present invention has analyzed the device from various viewpoints to make the above described magnetic tape library device better, and extracted problems possible to occur. As a result, Applicant has found that the following problem could occur.

That is, the front magazine disposed on the front side of the device main body 111 is extracted by an operator with his/her hand as needed; however, in a case of extracting the rear magazine 122 disposed on the back side of the device main body 111, the magazine slider 125 is firstly drawn to pull the rear magazine 122 to the front side, and then the rear magazine 122 is extracted by being pulled with hand in the same operation as in the case of the front magazine. As a result, the extraction works for the front magazine and the rear magazine 122 becomes different operations. Therefore, it takes extra effort, and the operability is poor.

Also, both the front magazine and the rear magazine 122 do not have a locking mechanism for locking the magazine at a prescribed position when the magazine is extracted. Therefore, it is necessary to devise a configuration with which the magazine is hold at a prescribed position in the device certainly for preventing the magazine from falling out of the device unexpectedly and enhancing the safety. Required further is to provide the magazine slider 125 for pulling out the rear magazine 122 on one side face of the device main body 111. So, there also arises such a problem that the configuration of the magnetic tape library device becomes complicated.

SUMMARY OF THE INVENTION

In order to solve the foregoing problems, an exemplary object of the invention is to provide a magnetic tape library device with which a plurality of housed magazines can be extracted safely from the device by executing the same operation, and the configuration is made to be simple.

The magnetic tape library device according to the present invention includes: a plurality of cartridge housing bodies for housing a plurality of magnetic tape cartridges inside thereof; a device main body for housing the cartridge housing bodies within a same plane in a freely movable manner and in series in an inserting/extracting direction from an inserting/extracting slot; a connecting mechanism for enabling the plurality of cartridge housing bodies to be connected with each other or to be released by a releasing operation from outside; and a locking mechanism for enabling at least the cartridge housing body on the back side of the inserting/extracting direction of the device main body, among the plurality of cartridge housing bodies, to be locked or to be released from the locked state at the inserting/extracting slot side, wherein the cartridge housing body on the back side includes an operation mechanism part of the locking mechanism.

DETAILED DESCRIPTION OF THE EXEMPLARY EMBODIMENTS

Figure 1:
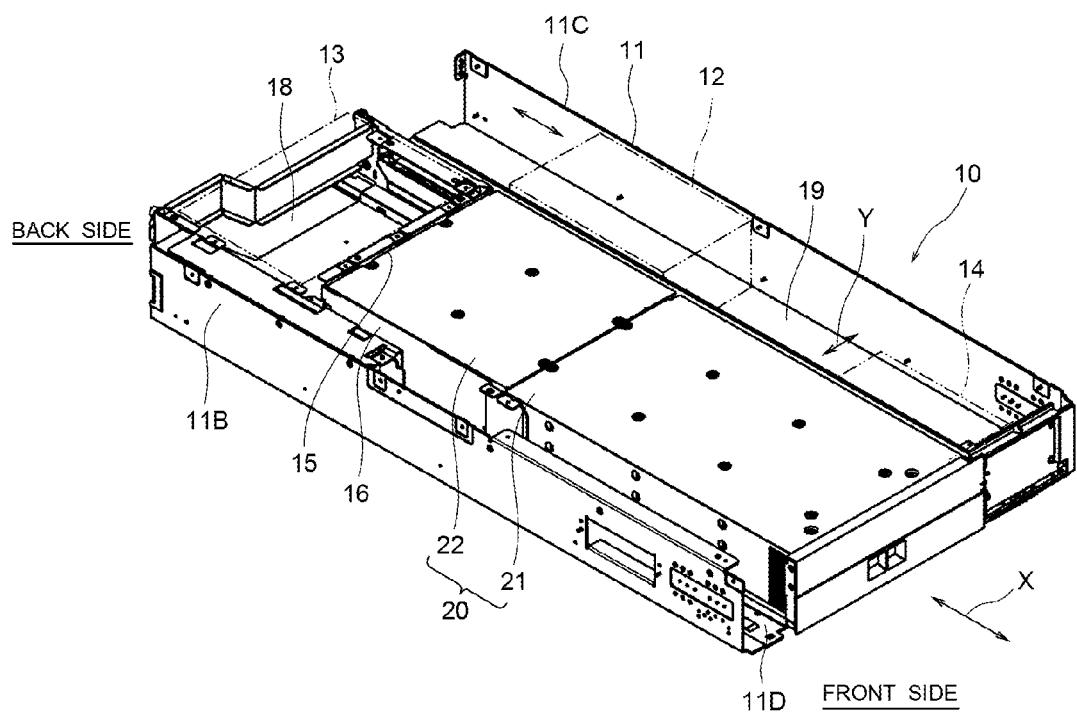
FIG. 1 is an overall perspective view showing an exemplary embodiment of a magnetic tape library device according to the present invention.

Hereinafter, an exemplary embodiment of a magnetic tape library device (simply referred to as a device hereinafter) 10 of the present invention will be described in detail by referring to FIGS. 1 to 11.

First, an overall outline of the device 10 is explained according to FIG. 1 to FIG. 4. As shown in FIG. 1 to FIG. 4, the device 10 is configured with: a magazine 20 as a plurality of cartridge housing bodies for respectively housing a plurality of magnetic tape cartridges 14 (shown with the imaginary line) inside thereof; and a device main body 11 to which the magazine 20 is slidably loaded within a horizontal plane in a series state along an inserting/extracting direction X.

Further, the device 10 includes: a latch mechanism 30 for enabling a plurality of magazines 20 to be connected with each other or to be released by a releasing operation from outside; and a locking mechanism 40 for enabling the plurality of magazines 20 to be locked with respect to the device main body 11 at the inserting/extracting slot side 11D or to be released from the locked state. And an operation mechanism unit 45 of the locking mechanism 40 is provided to each of the plurality of magazines 20.

Here, in FIG. 1, it is assumed that the diagonally forward lower-right of the device main body 11 is defined as the front side of the device 10 and the diagonally upper-left of the device main body 11 is defined as the back side of the device 10. An accessor mechanism 12 for transporting the magnetic tape cartridge 14 taken out from the magazine 20 is movably provided to the one of the side faces along the inserting/extracting direction X of the device main body 11.

Further, on the inner-side position of the magazine 20 of the device main body 11, disposed is a magnetic tape drive 13 for reading/writing data by loading the magnetic tape cartridge 14 that is transported by the accessor mechanism 12.

Furthermore, the device main body 11 and the accessor mechanism 12, the magnetic tape drive 13, the magazine 20, and the like mounted to the device main body 11 are covered by a detachable upper cover (not shown).

Figure 2:
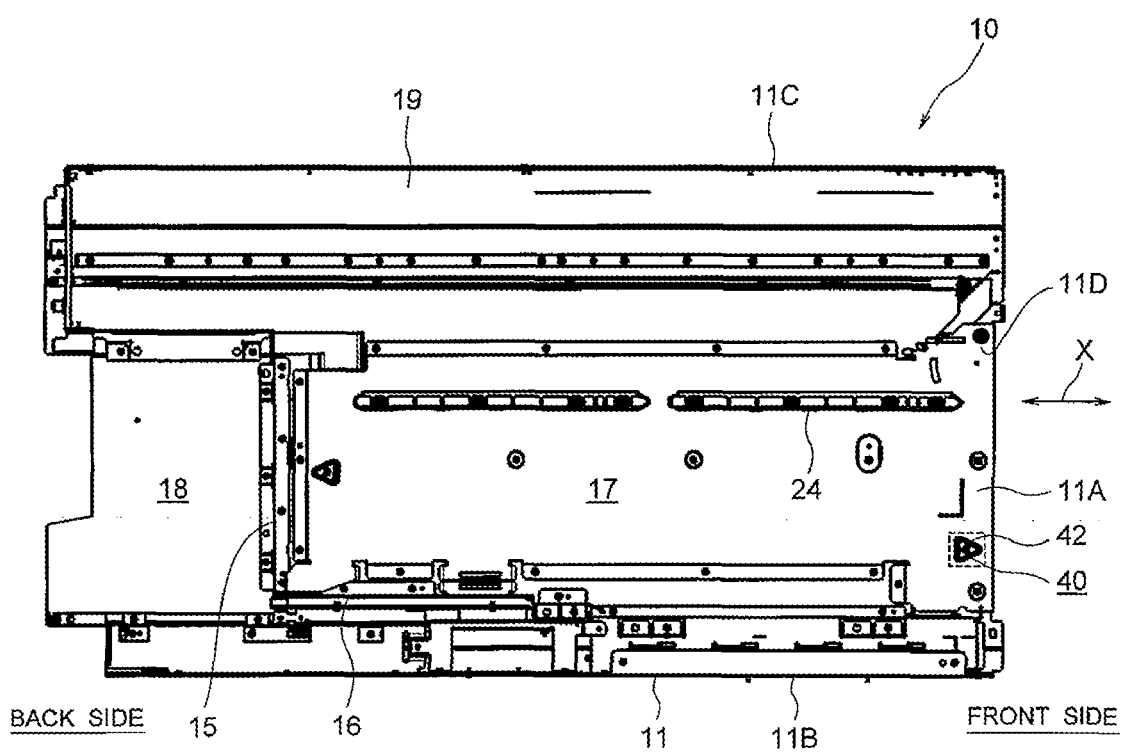
FIG. 2 is an overall plan view showing a device main body of the exemplary embodiment.

As shown in FIG. 2, the device main body 11 is formed with a thin steel plate or the like, and the overall plan shape thereof is formed in a rectangular shape.

Further, in the device main body 11, a first chassis part 11B is formed by being raised up from a bottom face part 11A (see FIG. 2) of the device main body 11 on one of its side faces along the longitudinal direction (inserting/extracting direction X). On the other side face, a second chassis part 11C is formed by being raised up from the bottom face part 11A of the device main body 11 and by being opposed to the first chassis part 11B.

The first chassis part 11B is formed to have substantially a prism sectional shape, although not shown in detail. A power source, a cooling device, and the like are housed inside thereof. Meanwhile, the second chassis part 11C is disposed by being opposed to the first chassis part 11B, and it is provided at a position with a prescribed space in a direction that goes away towards the outer side from the magazine 20.

Further, the magnetic tape cartridge 14 extracting side of a front magazine 21 and a rear magazine 22 configuring the magazine 20 is opposed to the second chassis part 11C. The space between the extracting side of the both magazines 21, 22 and the second chassis part 11C serves as an accessor moving space 19 for the accessor mechanism 12 to transport the magnetic tape cartridge 14.

In the device main body 11, the space sandwiched by the bottom face part 11A, the first chassis part 11B, and the second chassis part 11C forms something like a U-shaped pathway. On relatively the back side of such space in the inserting/extracting direction X, a first partition member 15 is provided to be in orthogonal to the inserting/extracting direction X.

This first partition member 15 is formed to have substantially a same top-face height as those of the both chassis parts 11B and 11C.

Furthermore, on one end part of the first partition member 15 on the first chassis part 11B side, a second partition member 16 is provided continuously from the one end of the first partition member 15 to form an L-letter shape with the first partition member 15. The length of the second partition member 16 is almost equal to the length of the rear magazine 22 in the inserting/extracting direction X. With this, when the rear magazine 22 is at a position on the back side of the inserting/extracting direction X, the back side face and one face orthogonal to that face are respectively surrounded by the first partition member 15 and the second partition member 16.

Figure 3:
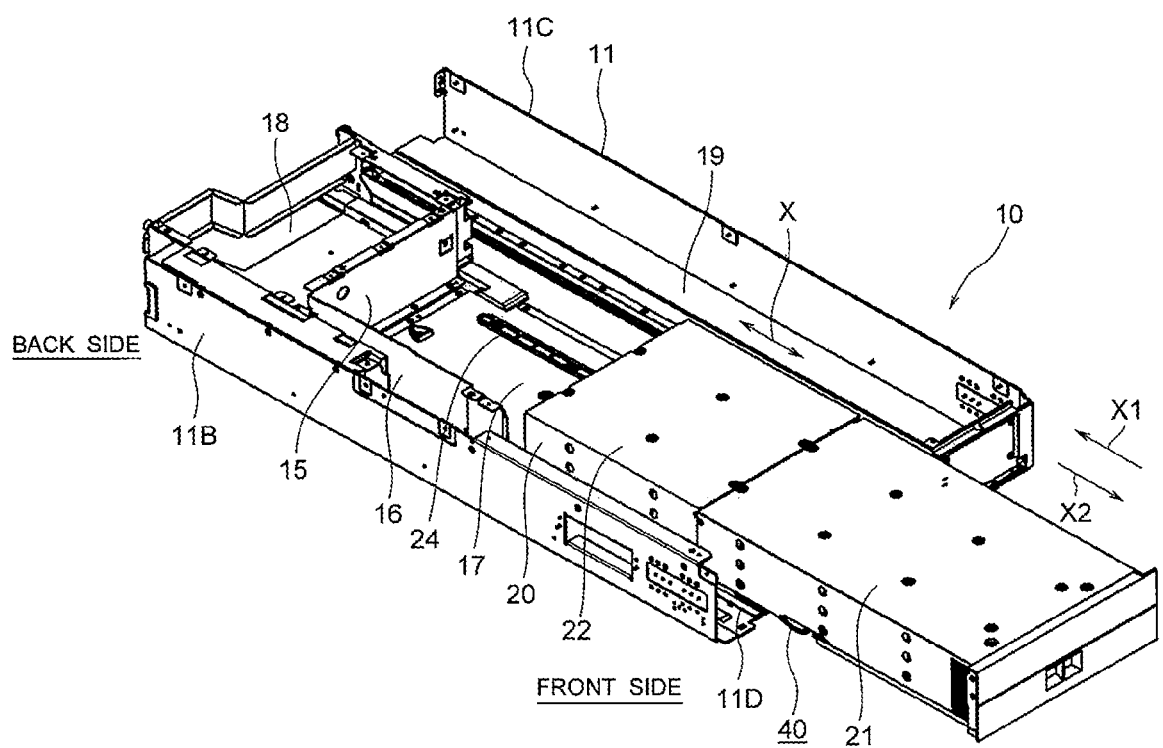
FIG. 3 is an overall perspective view showing a state where a rear magazine and a front magazine according to the exemplary embodiment are inserted and pulled out to/from the device main body.
Figure 4:
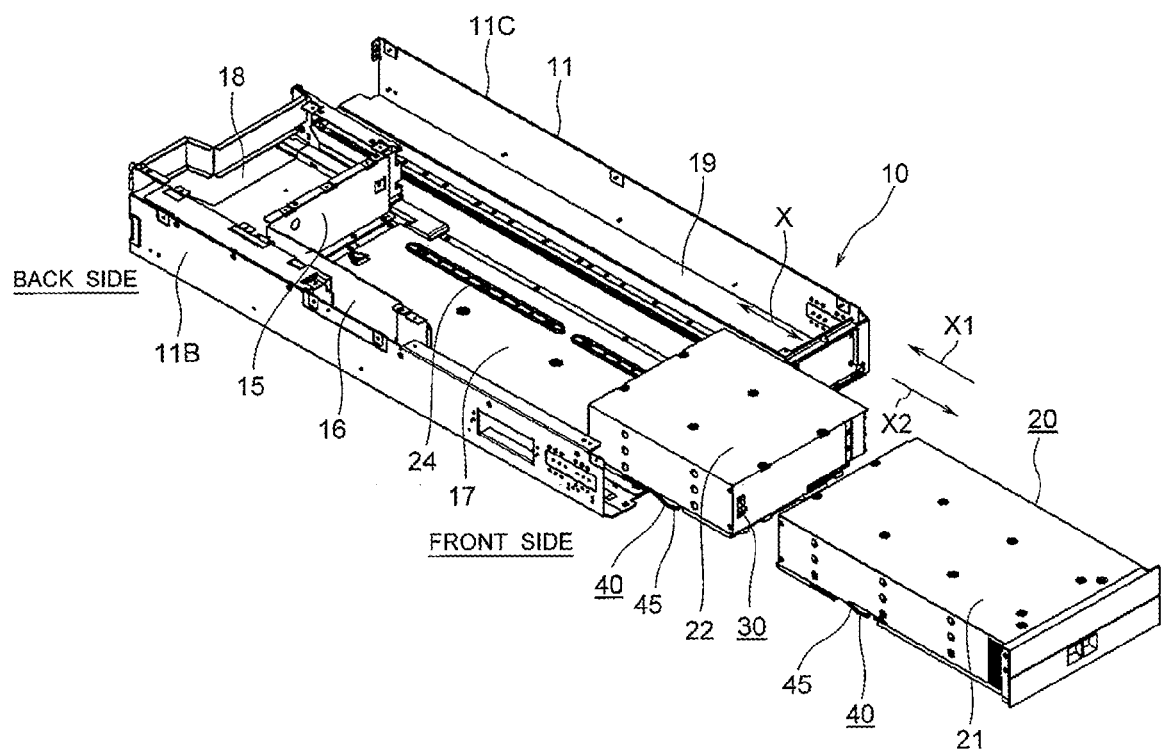
FIG. 4 is an overall schematic perspective view showing a state where a front magazine and a rear magazine according to the exemplary embodiment are inserted and pulled out to/from the device main body.

The front side of the inserting/extracting direction X sectioned by the partition member 15 is a magazine housing space 17 for housing the magazine 20 (see FIG. 2), and the back side of the inserting/extracting direction X sectioned by the first partition member 15 is a drive set space 18 for setting the magnetic tape drive 13. Note that the accessor mechanism 12 and the magnetic tape drive 13 are omitted in FIG. 3 and FIG. 4. Also, FIG. 3 and FIG. 4 show a state in which the magazine 20 is inserted and a state in which the magazine 20 is extracted The magazine 20 is provided to the device main body 11 within a horizontal plane in a freely movable manner along the inserting/extracting direction X.

That is, the magazine 20 is configured with the front magazine 21 disposed on the front side along the inserting/extracting direction X and the rear magazine 22 disposed on the back side along the inserting/extracting direction X. Those front magazine 21 and the rear magazine 22 are placed within the magazine housing space 17 in a series state along the inserting/extracting direction X.

Each of the front magazine 21 and the rear magazine 22 is formed in a thin box shape having a top face part and a bottom face part, and the inside thereof is sectioned appropriately for being able to house a plurality of magnetic tape cartridges 14. The rear end face in the inserting/extracting direction X of such rear magazine 22 is to abut against the surface of the first partition member 15. Further, the front end face in the inserting/extracting direction X of the rear magazine 22 is to abut against the rear end face of the front magazine 21.

As described above, the front magazine 21 and the rear magazine 22 are formed to be freely slidable within the magazine housing space 17 along the inserting/extracting direction X by being guided by a guide rail 24 (see FIG. 2) laid on the bottom face part 11A of the device main body 11.

Although not shown, for example, eighteen magnetic tape cartridges 14 in total, i.e., three stacked cartridges in three rows in the inserting/extracting direction X and in two rows in a left-right direction Y orthogonal to the inserting/extracting direction X, can be housed inside the front magazine 21 of the exemplary embodiment.

In the meantime, although not shown, twelve magnetic tape cartridges 14 in total, i.e., three stacked cartridges in two rows in the inserting/extracting direction and in two rows in the direction orthogonal to the inserting/extracting direction, are housed inside the rear magazine 22 for example.

As described above, in the exemplary embodiment, the numbers of the magnetic tape cartridges 14 that can be housed inside both magazines 21 and 22 are different. That is, the sizes of both magazines 21 and 22 are different.

Transfer of the magnetic tape cartridges 14 inside the both magazines 21, 22 to the accessor mechanism 12 is done by a known transfer mechanism mounted into the rear magazine 22 and a receiving mechanism of the accessor mechanism 12. After receiving a prescribed magnetic tape cartridge 14, the accessor mechanism 12 moves in the accessor transfer space 19, and gives the magnetic tape cartridge 14 to the magnetic tape drive 13.

Figure 5:
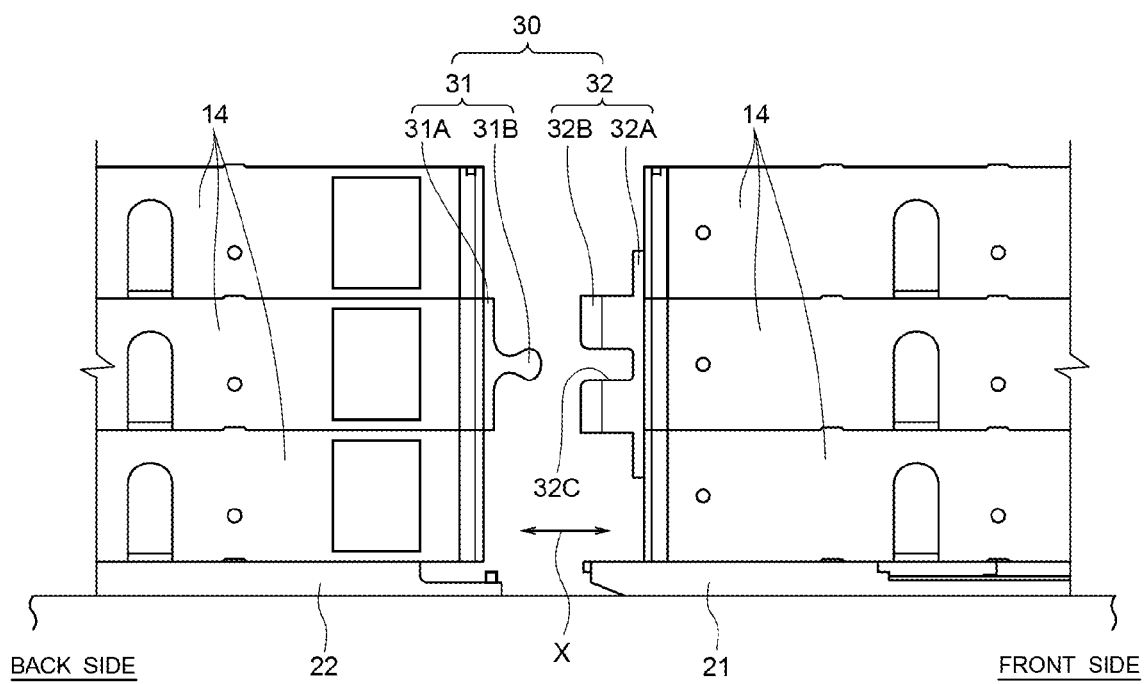
FIG. 5 is a side view showing a connecting mechanism provided to the front magazine and the rear magazine according to the exemplary embodiment, where the connecting mechanism is not operating.
Figure 6:
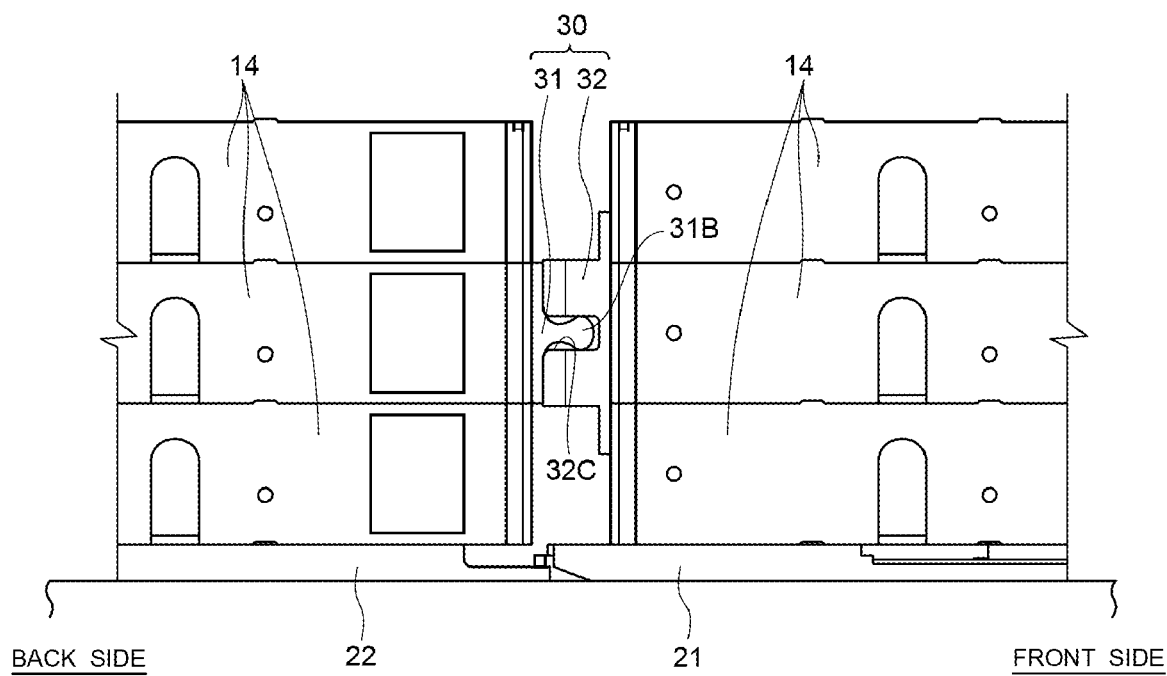
FIG. 6 is a side view showing the connecting mechanism provided to the front magazine and the rear magazine according to the exemplary embodiment, where the connecting mechanism is operating.

The front magazine 21 and the rear magazine 22 are mutually connected with a constant force by the latch mechanism 30 as shown in FIG. 5 and FIG. 6.

The latch mechanism 30 is configured with an engagement member 31 and an engagement reception member 32. The engagement member 31 and the engagement reception member 32 are provided to opposed faces of the rear magazine 22 and the front magazine 21 respectively.

That is, the engagement member 31 is fixed on a front end face to be the opposed face of the rear magazine 22, and the engagement reception member 32 is fixed on a back end face to be the opposed face of the front magazine 21.

The engagement member 31 is formed of an attachment part 31A and a ball part 31B integrally formed with the attachment part 31A. Also, the engagement reception member 32 is formed of an attachment part 32A and a receiving part 32B having a ball catch part 32C integrally formed with the attachment part 32A.

The latch mechanism 30 configured as described above is provided at a position shifted to one side from a center part in the width direction on the opposed face of each of the magazines 21 and 22 as shown in FIG. 4.

Further, when connecting the front magazine 21 and the rear magazine 22, the front magazine 21 is pushed along the inserting direction X with respect to the rear magazine 22 which is inserted and housed in advance in the device main body 11 as shown in FIG. 5, and the ball part 31B of the engagement member 31 and the ball catch part 32C of the engagement reception member 32 are engaged. With this, both magazines 21 and 22 are connected.

Here, the engaging state between the ball part 31B and the ball catch part 32C is as follows: when the front magazine 21 is pulled out from the device main body 11 with the both magazines 21 and 22 being connected, the rear magazine 22 is also pulled out coupled with the front magazine 21; thereafter, when the front magazine 21 is to be extracted from the device main body 11 with the rear magazine 22 being locked by the locking mechanism 40 described later, the engagement between the ball part 31B and the ball catch part 32C is released; then, both parts 31B and 32C are separated. The latch mechanism 30 is configured as described; therefore, the rear magazine 22 disposed on the back side of the device main body 11 can be easily pulled out merely by pulling and extracting the front magazine 21 from the device main body 11.

In this exemplary embodiment, a marketed product is utilized as the latch mechanism 30.

Also in this exemplary embodiment, in order to prevent the both magazines 21 and 22 from falling out of the device main body 11 unexpectedly for any reason when extracting them from the device main body 11, the locking mechanisms 40 for locking the both magazines 21 and 22 to the device main body 11 are provided to the front magazine 21 and the rear magazine 22 as shown in FIGS. 3 and 4.

Figure 7:
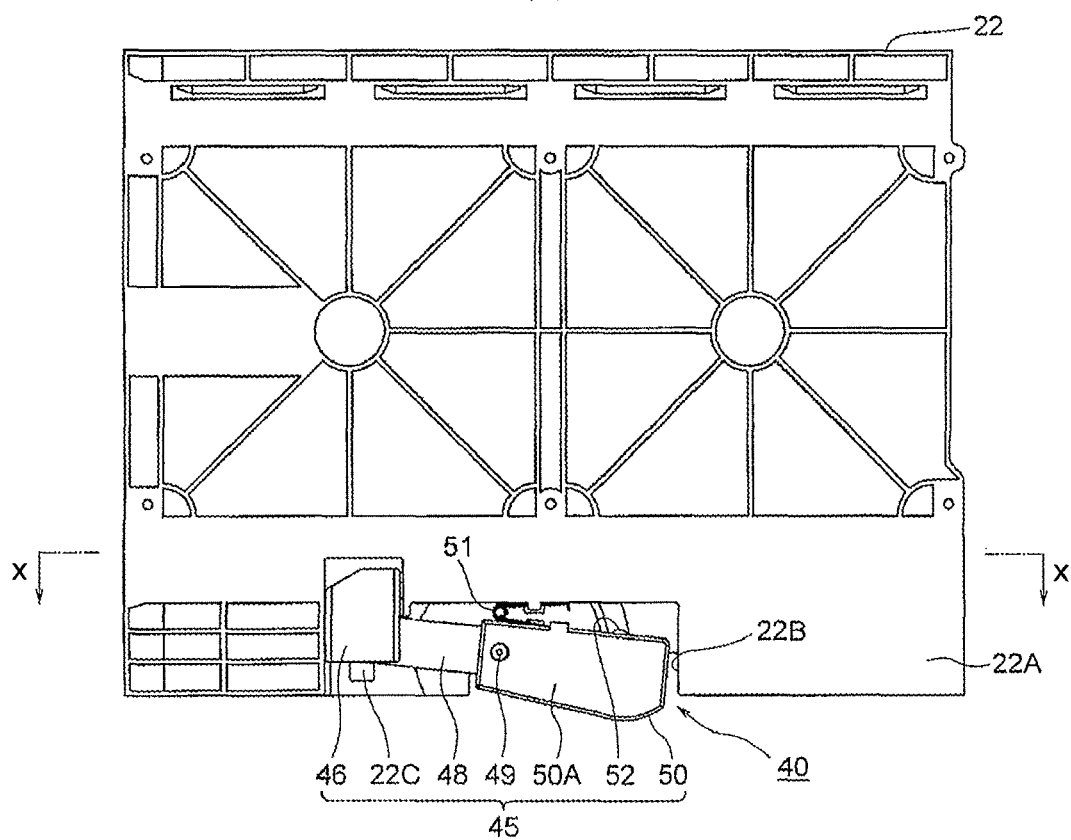
FIG. 7 is a plan view showing a state where an operation mechanism part configuring the locking mechanism according to the exemplary embodiment is provided to the rear magazine.

The locking mechanism 40 is configured with an engaging body 41 (see FIG. 11) formed by including a projection member 42 fixed to the device main body 11, as shown in FIG. 2, and an operation mechanism part 45 provided to the rear magazine 22, as shown in FIG. 7 and the like.

The operation mechanism part 45 of the front magazine 21 is provided at a position closer to a back end side in the inserting/extracting direction X and lower part of one side face along the inserting/extracting direction X, and the operation mechanism part 45 of the rear magazine 22 is provided at lower position of substantially the center part along the inserting/extracting direction X and lower position of one side face along the inserting/extracting direction X.

Figure 10:
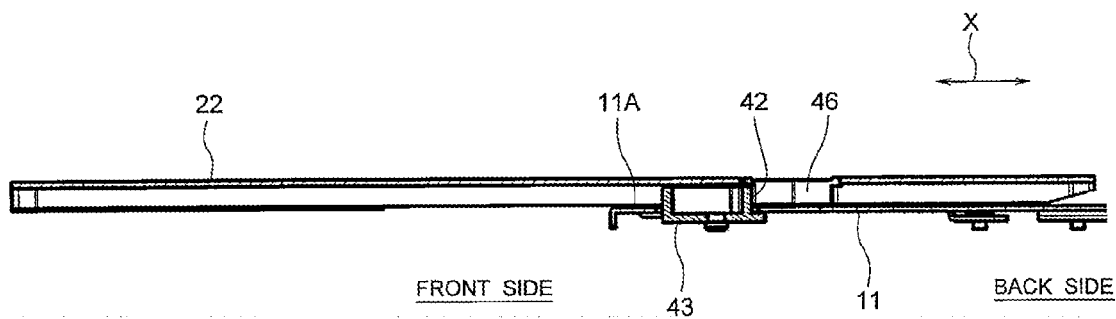
FIG. 10 is a longitudinal sectional view taken along a line X-X of FIG. 7.
Figure 11:
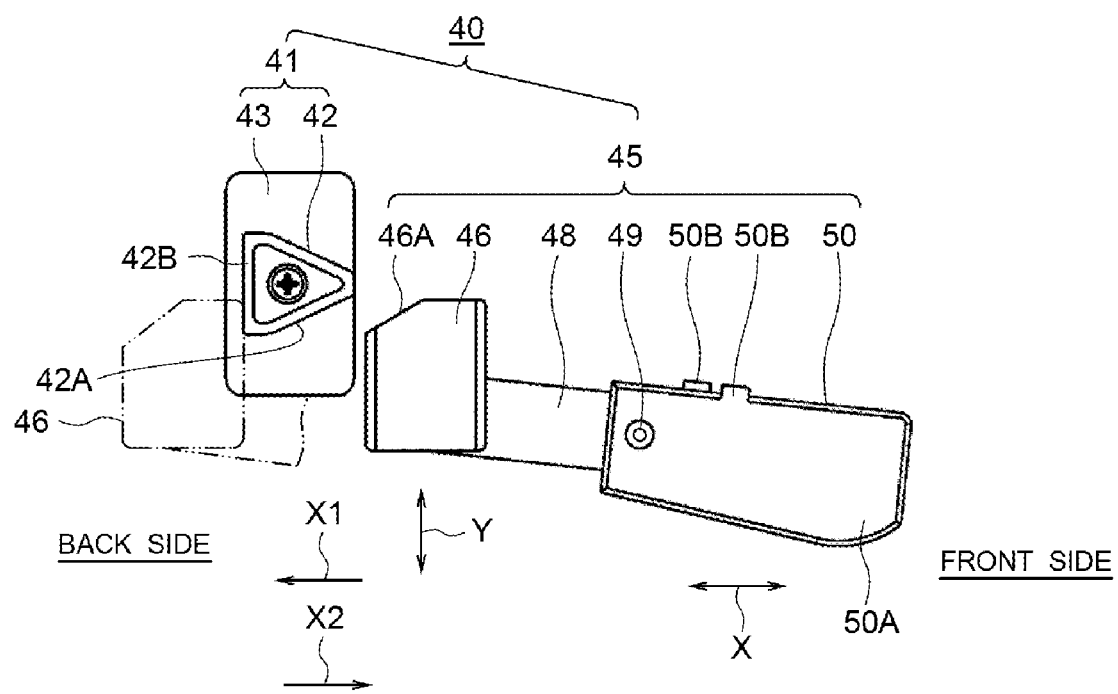
FIG. 11 is a plan view showing a relation between a projection member configuring the locking mechanism according to the exemplary embodiment and the lock part.
Figure 12:
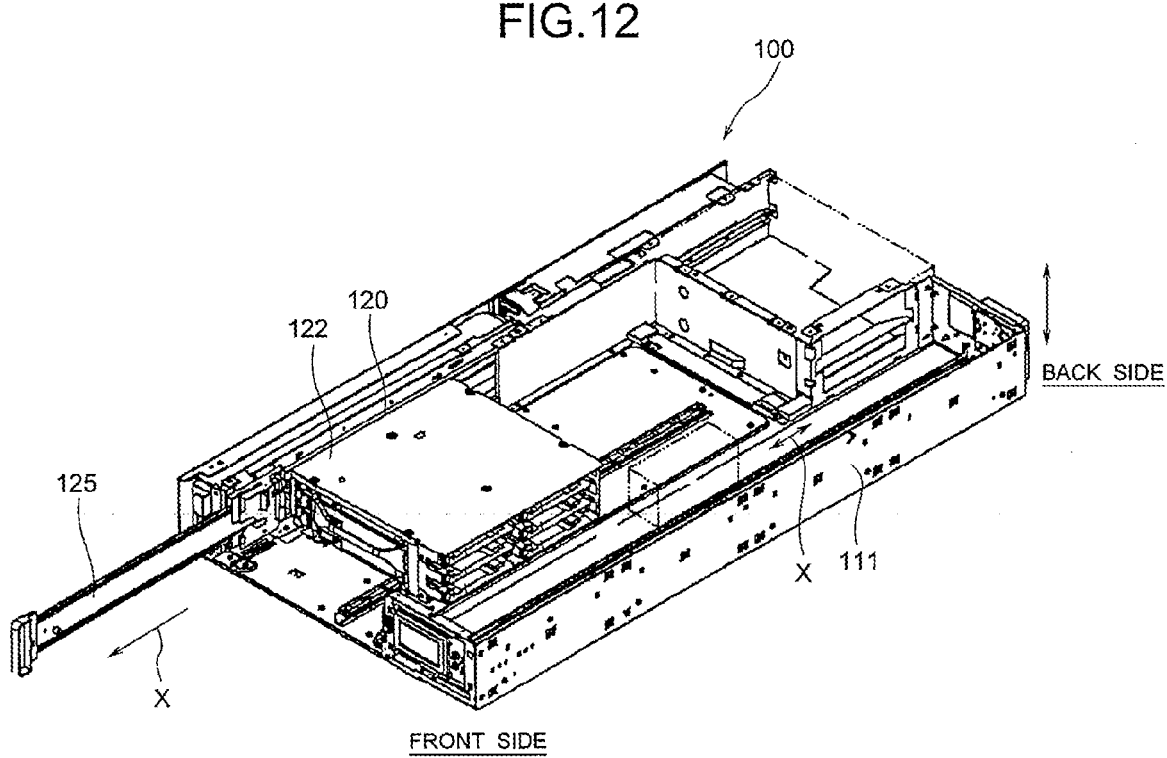
FIG. 12 is an overall perspective view showing a general-purpose magnetic tape library device.

The engaging body 41 is configured with an projection member 42 formed in a plan triangle shape as shown in FIG. 11 in detail and an attachment plate 43 for attaching the projection member 42. The attachment plate 43 is fixed to the bottom part 11A of the device main body 11 as shown in FIGS. 2 and 10.

The operation mechanism parts 45 are provided to both the front magazine 21 and the rear magazine 22 as described. Hereinafter, the operation mechanism part 45 provided to the rear magazine 22 will be explained as shown in FIGS. 7 to 11 as a representative example.

The operation mechanism part 45 includes: a rotating lever part 50 having an operation part 50A at one end part thereof and having a lock notch 46 as a front end abutting member at the other end part thereof which moves by being guided with the projection member 42 for engaging; a pin member 49 as a rotation support shaft which is provided to the rear magazine 22 and supports the rotating lever part 50 rotatably at the center part of the rotating lever part 50; and a torsion coil spring 51 as an urging device which urges the operation part 50A side of the rotating lever part 50 toward outside of the rear magazine 22 constantly.

When the rear magazine 22 moves in a direction of forward movement indicated by an arrow X1 along the inserting/extracting direction X, the lock notch 46 abuts to the projection member 42 and slides outside from the projection member 42 along a direction Y orthogonal to the inserting/extracting direction X as shown in FIG. 11. Then, the lock notch 46 is engaged when passing through the projection member 42. The lock notch 46 is formed in a block shape elongated slightly in the Y direction, and housed in a U-shaped notch part 22B formed on a bottom face 22A of the rear magazine 22 as shown in FIGS. 7 and 11 in detail.

Figure 9:
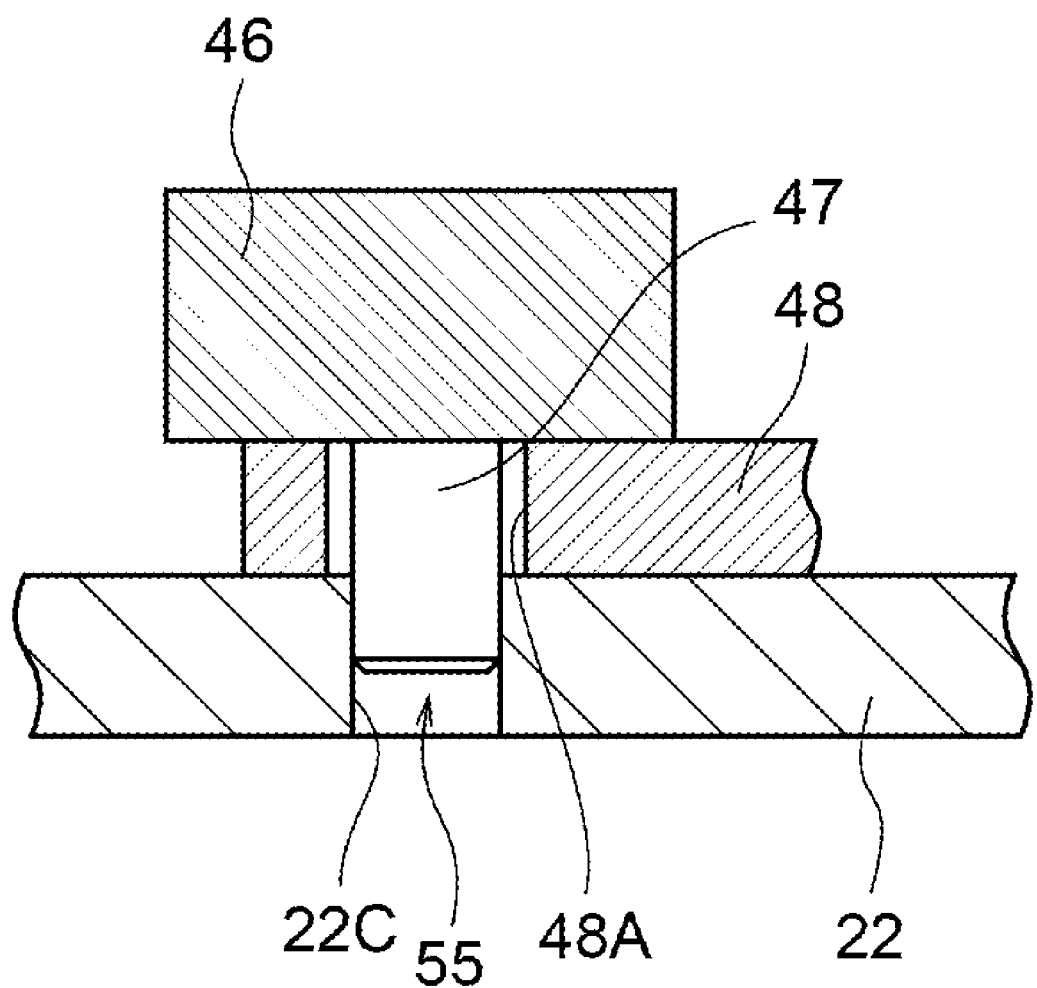
FIG. 9 is a longitudinal sectional view taken along a line IX-IX of FIG. 8.

Also, as shown in FIG. 9 in detail, a guide pin 47 is attached on a back face of the lock notch 46 to be directed downward. The guide pin 47 is arranged below the lock notch 46 and penetrating a long hole 48A formed at a shaft 48 configuring the other end part of the rotating lever part 50 as shown in FIG.

8. With this, the lock notch 46 is supported by the shaft 48. The long hole 48A is formed along the longitudinal direction of the shaft 48.

The guide pin 47 penetrates through the long hole 48A of the shaft 48, and also, is inserted in a guide groove 22C formed at the U-shaped notch part 22B of the rear magazine 22. The guide groove 22C is formed with a prescribed dimension extended linearly in the Y direction.

The shaft 48 is connected with the rotating lever part 50 by a rotation support shaft 49 as a rotation center member. The rotating lever part 50 is housed in the U-shaped notch part 22B at the bottom face 22A of the rear magazine 22.

Here, the long hole 48A of the shaft 48 is formed along the shaft 48. When the rotating lever part 50 rotates against the urging force of the torsion coil spring 51, a tip end part of the shaft 48, i.e. a portion where the long hole 48A is formed, moves in a circular pattern centering the pin member 49.

Meanwhile, the guide pin 47 of the lock notch 46 is inserted in the guide groove 22C after penetrating through the long hole 48A, and slides in the Y direction orthogonal to the inserting/extracting direction X. As described, the long hole 48A formed at the shaft 48 moving in a circular pattern allows the guide pin 47 to move linearly. With those configurations, rotation movement of the rotating lever part 50 is converted to linear movement of the lock notch 46.

That is, a linear conversion mechanism 55 is configured with the long hole 48A formed at the shaft 48, the guide pin 47 of the lock notch 46, and the guide groove 22C formed at the U-shaped notch part 22B of the rear magazine 22.

The torsion coil spring 51 as an urging device is provided between an inner side face of the rotating lever part 50 and a side face of the U-shaped notch part 22B. The torsion coil spring 51 constantly urges the lock notch 46 integrally formed with the rotating lever part 50 toward the projection member 42 side direction by urging the operation part 50A of the rotating lever part 50 toward outside of the rear magazine 22.

Note that, in FIG. 11, reference numerals 50B and 50B indicate spring fixing parts for fixing one side end part of the torsion coil spring 51.

Figure 8:
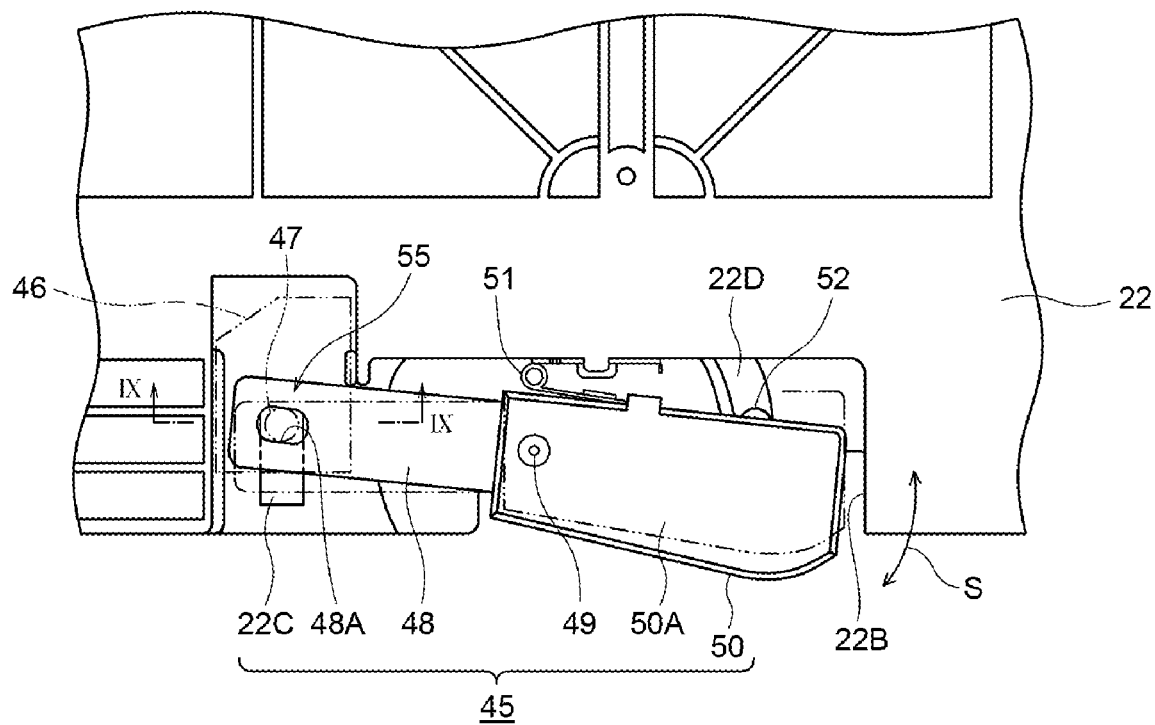
FIG. 8 is an enlarged plan view showing the operation mechanism part configuring the locking mechanism in FIG. 7 in detail.

As the operation mechanism part 45 is configured as described above, the rotating lever part 50, the shaft 48, and the lock notch 46 rotate in an arrow S direction centering the rotation support shaft 49 within a horizontal plane as shown in FIG. 8.

Note that the guide pin 52 is provided on the back face of the rotating lever part 50 as described, and the guide pin 52 slides along an arch shaped guide groove 22D formed at a gap part within the U-shaped notch part 22B.

Next, the relation between the projection member 42 configuring the locking mechanism 40 and the operation mechanism part 45 will be explained based on FIG. 11.

The projection member 42 is formed in a plane triangle shape as described above, where a base of the triangle is being an engaging face 42B for engaging with the lock notch 46. This engaging face 42B is arranged so as to be in parallel with the Y direction orthogonal to the inserting/extracting direction X.

Also, one oblique side of the triangle is being a guide face 42A for guiding the tip end part in the Y direction of the lock notch 46 when the rear magazine 22 moves. Meanwhile, one end part in the Y direction of the lock notch 46 is being an end face, and an oblique face 46A for engaging with the guide face 42A is formed at a part of the end face.

When the rotating lever part 50 of the operation mechanism part 45 is in an initial state, i.e. in a state where the lock notch 46 and the projection member 42 are not engaged, the end part of the lock notch 46 where the oblique face 46A is formed is located substantially on a line extended from the apex of the triangle shaped projection member 42 along the inserting/extracting direction X.

The operation of the locking mechanism 40 configured as described above will be explained based on FIG. 11.

Note that, in FIG. 11, the lock notch 46 is urged by the urging force applied by the torsion coil spring 51 toward the projection member 42 side.

When the rear magazine 22 (omitted in FIG. 11) to which the operation mechanism part 45 of the locking mechanism 40 is loaded moves forward in the arrow X1 direction from the front side of the device main body 11 along the inserting/extracting direction X, the oblique face 46A of the lock notch 46 and the guide face 42A of the projection member 42 begin to engage.

When the rear magazine 22 further moves forward, the lock notch 46 is guided to the guide face 42A of the projection member 42. At this time, since the guide face 42A is formed obliquely, the lock notch 46 is pushed to outside in the Y direction orthogonal to the inserting/extracting direction X as the lock notch 46 moves forward. And this time, the lock notch 46 slides against the urging force of the torsion coil spring 51.

When the operation mechanism part 45 further moves, engagement between the lock notch 46 and the projection member 42 is released. Then, the lock notch 46 pushed by the guide face 42A of the projection member 42 is returned to the projection member 42 side by the urging force of the torsion coil spring 51 to engage with the engage face 42B of the projection member 42 as shown in FIG. 11 with the imaginary line.

In this state, the rear magazine 22 freely moves toward the back side of the device main body 11.

On the other hand, in a state where the lock notch 46 engages with the engage face 42B, a back end face in the forwarding direction X1 of the lock notch 46 is hooked on the engage face 42B of the projection member 42, and the rear magazine 22 is not possible to be moved in the extracting direction X2; that is, the rear magazine 22 is not possible to be extracted. With this, the rear magazine 22 is locked to the device main body 11.

To release the locked state, an operator pushes the operation part of the rotating lever part 50 with his/her finger or the like and rotates the rotating lever part 50 by using the rotation support shaft 49 as a fulcrum.

With this, the operation part 50A of the rotating lever part 50 moves against the urging force of the torsion coil spring 51 and the lock notch 46 is moved outside in the Y direction. Then the engagement between the lock notch 46 and the projection member 42 is released. At this state, by pulling the rear magazine 22, the rear magazine 22 can be extracted from the device main body 11.

Next, operations of the device 10 configured in the above-described manner will be described.

First, for having a prescribed magnetic tape cartridge 14 within the front magazine 21 and the rear magazine 22 within the device main body 11 read by the magnetic tape drive 13, one of the magnetic tape cartridges 14 taken out from the front magazine 21 or the rear magazine 22 is grasped by the accessor mechanism 12 that transports the cartridge 14 within the accessor moving space 19, the accessor mechanism 12 is moved to the magnetic tape drive 13 position, and the transported magnetic tape cartridge 14 is loaded to the magnetic tape drive 13 at the movable end position. When prescribed reading or the like of a plurality of magnetic tape cartridges 14 within the front magazine 21 and the rear magazine 22 ends and it becomes necessary to exchange the cartridge with a new magnetic tape cartridge 14, first, an operator extracts the front magazine 21 located on the front side of the inserting/extracting direction X with his/her hand to exchange the cartridge outside the device 10. Then, the operator proceeds to the extraction work of the rear magazine 22 that is located on the back side of the inserting/extracting direction X. Next, the procedure of inserting the rear magazine 22 and the front magazine 21 into the device 10 will be explained by referring to FIGS. 3 to 6.

First, the operator inserts the rear magazine 22 into the device main body 11 from the inserting/extracting slot 11B of the device main body 11, and moves the rear magazine 22 to the back side of the device main body 11.

When the rear magazine 22 is moved, the lock notch 46 of the locking mechanism 40 provided to the rear magazine 22 begins to engage with the projection member 42 arranged on the device main body 11. When the rear magazine 22 is pushed further, the engagement between the lock notch 46 and the projection member 42 is released, and the lock notch 46 engages with the engage face 42B of the projection member 42. At this time, the rear magazine 22 is locked, and it cannot be extracted from the device main body 11.

Next, the front magazine 21 is inserted into the device main body 11 and pushed until the rear magazine 22 contacts with the first partition member 15. As the front magazine 21 moves inside, it engages with the projection member 42, and then engages with the engage face 42B thereof. At this time, the front magazine 21 also cannot be extracted from the device main body 11.

When the front magazine 21 is subsequently pushed, the ball catch part 32C of the engagement reception member 32 at the front magazine 21 and the ball part 31B of the engagement reception member 31 at the rear magazine 22 are engaged with each other, and the ball catch part 32C and the ball part 31B are locked completely. With this, the front magazine 21 and the rear magazine 22 are connected.

Described above is the procedure of inserting the front magazine 21 and the rear magazine 22. Next, the procedure of extracting the both magazines 21 and 22 will be explained.

First, the operator pulls the front magazine 21 disposed and housed on the front side of the device main body 11 with both hands. While the front magazine 21 is being pulled out, the lock notch 46 of the operation mechanism part 45 of the front magazine 21 is hooked on the engage face 42B of the projection member 42 provided at the inserting/extracting slot side of the device main body 11.

Then, the operator pushes the operation part 50A of the rotating lever part 50 at the operation mechanism part 45 with a finger of his/her left hand while supporting the front magazine 21 with both hands. With this, the rotating lever part 50 rotates against the urging force of the torsion coil spring 51, the lock notch 46 slides to outside in the Y direction orthogonal to the inserting/extracting direction X, and the engagement between the lock notch 46 and the projection member 42 is released. Thereafter, the operator pulls out the front magazine 21 while pushing the operation part 50A of the rotating lever part 50 with his/her finger.

The rear magazine 22 connected to the front magazine 21 through the latch mechanism 30 is also moved from the back side to the front side of the device main body 11 as the front magazine 21 is pulled out. While the rear magazine 22 moves, the lock notch 46 of the operation mechanism part 45 of the rear magazine 22 is hooked on the engage face 42A of the projection member 42 this time, and the rear magazine 22 cannot be pulled out any more; that is, the rear magazine 22 is locked. When the operator confirms the locked state, he/she pulls out the front magazine 21 by applying a little more force.

Then, engagement between the ball part 31B and the ball catch part 32B of the latch mechanism 30 connecting the both magazines 21 and 22 is released, and the front magazine 21 and the rear magazine 22 are separated. At this time, the rear magazine 22 is locked at the position of the projection member 42 of the device main body 11 by the action of the locking mechanism 40, and prevented from falling out of the device main body 11 unexpectedly.

After storing the front magazine 21 extracted from the device main body 11 as described above in a prescribed storing position, the rear magazine 22 is extracted from the device main body 11 sequentially. The extracting operation of the rear magazine 22 is executed similarly to that of the front magazine 21.

That is, the operator pushes the operation part 50A of the rotating lever part 50 at the operation mechanism part 45 with a finger of his/her left hand while supporting the rear magazine 22 with both hands. With this, the rotating lever part 50 rotates against the urging force of the torsion coil spring 51, the lock notch 46 slides to outside in the Y direction orthogonal to the inserting/extracting direction X, and the engagement between the lock notch 46 and the projection member 42 is released. Thereafter, the operator pulls out the rear magazine 22 while pushing the operation part 50A of the rotating lever part 50 with his/her finger.

Since the magnetic tape library device according to the exemplary embodiment is configured as described above, it is possible to achieve following effects:

(1) When extracting the rear magazine 22 housed on the back side of the inserting/extracting direction X of the device main body 11, by merely pulling out the front magazine 21 housed on the front side of the inserting/extracting direction X, the rear magazine 22 connected to the front magazine 21 through the latch mechanism 30 can also be pulled out. As a result, the plurality of magazines 20 housed in the device main body 11 can be extracted by executing the same operation with a simple device, and the operability can be enhanced with this.

(2) Each of the front magazine 21 and the rear magazine 22 is provided with the locking mechanism 40. When the front magazine 21 is extracted, the operator puts one hand on the operation part 50A for operating the operation part 50A of the operation mechanism part 45 and, at the same time, puts another hand on the front magazine 21 unintentionally. With this, the front magazine 21 having a weight unsupportable by one hand can be supported surely, and it is possible to obtain a function as a foolproof mechanism for preventing the operator from unconsciously extracting the magazine with one hand and causing the damage on the magazine and injury of the operator due to the fallen magazine associated therewith. As a result, unexpected falling of the front magazine 21 due to its weight can be prevented. It is the same in the case of the rear magazine 22.

(3) Since the rear magazine 22 on the back side of the inserting/extracting direction X is locked by the locking mechanism 40 when pulling and extracting the front magazine 21 housed on the front side of the inserting/extracting direction X, it is possible to extract the front magazine 21 with the rear magazine 22 being left in the device main body 11 certainly. With this, the both magazines 21 and 22 connected with a certain force can be separated automatically.

(4) Since the latch mechanism 30 is formed by being attached on the opposed faces of the front magazine 21 and the rear magazine 22 using a marketed product, its configuration is being simple and its manufacturing cost can be reduced. The magnetic tape library device according to the present invention is configured as described above. As an exemplary advantage according to the invention, when extracting the cartridge housing body housed on the back side of the inserting/extracting direction of the device main body, by merely pulling out the cartridge housing body housed on the front side of the inserting/extracting direction, the cartridge housing body on the back side which is connected with the cartridge housing body on the front side through the connecting mechanism can be pulled out. As a result, the plurality of cartridge housing bodies housed in the device main body can be extracted by executing the same operation with a simple device, and the operability can be enhanced with this.

While the invention has been particularly shown and described with reference to exemplary embodiments thereof, the invention is not limited to these embodiments. Various kinds of modifications that occur to those skilled in the art can be applied to the structures and details of the present invention. Further, it is to be understood that the present invention includes appropriate combinations of a part of or the whole part of the structures described in each of the exemplary embodiments.

For example, in the exemplary embodiment, the latch mechanism 30 is provided at a position shifted to one side from a center part in the width direction on the opposed face of each of the front magazine 21 and the rear magazine 22; however, the provided position is not limited to this, and it may be provided at the center part in the width direction.

Also, in the exemplary embodiment, the engagement member 31 configuring the latch mechanism 30 is fixed on the opposed face of the rear magazine 22, and the engagement reception member 32B configuring the latch mechanism 30 is fixed on the opposed face of the front magazine 21; however, those configurations may be switched. That is, it may be configured such that the engagement member 31 is fixed on the front magazine 21 and the engagement reception member 32B is fixed on the rear magazine 22.

With this, the similar effects as described in (1) and (4) can be obtained.

Further, in the magnetic tape library device 10 according to the exemplary embodiment, each of the plurality of cartridge housing bodies houses two magazines, i.e. the front magazine 21 and the rear magazine 22; however, it is not limited to this. For example, three magazines may be housed therein.

Furthermore, in the magnetic tape library device 10 according to the exemplary embodiment, the locking mechanism 30 is provided to each of the front magazine 21 and the rear magazine 22; however, it is not limited to this. When the front magazine 21 is light in weight, required is that at least the rear magazine 22 is locked at the extracting operation of the front magazine 21. Therefore, it may be configured such that the locking mechanism 30 is provided only to the rear magazine 22 in a relation with the latch mechanism 30.

However, in a case that the front magazine 21 is heavy in weight, it is preferable to provide the locking mechanism 30 to the front magazine 21, in order to add a function as a foolproof mechanism for preventing the operator from unconsciously extracting the magazine with one hand and causing the damage on the magazine and injury of the operator due to the fallen magazine associated therewith.

INDUSTRIAL APPLICABILITY

The present invention is used for arranging and housing a plurality of cartridge housing bodies having a plurality of magnetic tape cartridges housed therein in series in the inserting/extracting direction.

What is claimed is:

1. A magnetic tape library device comprising:
a plurality of cartridge housing bodies for housing a plurality of magnetic tape cartridges inside thereof;
a device main body for housing the cartridge housing bodies within a same plane in a freely movable manner and in series in an inserting/extracting direction from an inserting/extracting slot;
a connecting mechanism for enabling the plurality of cartridge housing bodies to be connected with each other so as to cause the connected cartridge housing bodies to move together in unison in the inserting/extracting direction or to be released by a releasing operation from outside the magnetic tape library device; and
a locking mechanism for enabling at least the cartridge housing body on a back side of the inserting/extracting direction of the device main body, among the plurality of cartridge housing bodies, to be locked so as to prevent the cartridge housing body on the back side from being released from the device main body or to be released from a locked state at the inserting/extracting slot side,
wherein the lock mechanism includes an operation mechanism unit that operates to release the locked state of the cartridge housing body,
wherein the operation mechanism unit includes a rotating lever part provided at one side face in a width direction of the cartridge housing body, and
wherein the rotating lever part releases the locked state of the device main body and the cartridge housing body with a force applied from outside the magnetic tape library device.

2. The magnetic tape library device as claimed in claim 1, wherein
the connecting mechanism is provided to each of opposed faces of one cartridge housing body and the other cartridge housing body along the inserting/extracting direction, and configured by including an engagement member provided to one cartridge housing body and an engagement reception member provided to the other cartridge housing body for engaging with the engagement member to connect the cartridge housing bodies.

3. The magnetic tape library device as claimed in claim 1, wherein
the locking mechanism includes a projecting member provided to a bottom face of the device main body and projected from the bottom face, and the operation mechanism part provided to one side face of the cartridge housing body along the inserting/extracting direction for engaging with the projecting member.

4. The magnetic tape library device as claimed in claim 3, wherein
the operation mechanism part includes: the rotating lever part having an operation part at one end part thereof and having a front end abutting member at the other end part thereof which moves by being guided with the projection member for engaging;
a rotation support shaft which is provided to the cartridge housing body and supports the rotating lever part rotatably at the center part of the rotating lever part; and
an urging device which urges the operation part side of the rotating lever part toward outside of the cartridge housing body constantly, wherein
the projection member includes: a guide face, which functions at a time of inserting the cartridge housing body, for guiding the front end abutting member in a direction orthogonal to the inserting/extracting direction against an urging force of the urging device; and, at a position located in a guided direction of the guide face, an engage face for engaging with the front end abutting member.

5. The magnetic tape library device as claimed in claim 4, wherein the other end part of the rotating lever part is set as a supporting part for supporting the front end abutting member, and a linear conversion mechanism for converting a rotation movement of the rotating lever part to a movement in a direction orthogonal to the inserting/extracting direction is provided between the supporting part, the front end abutting member, and the cartridge housing body.

6. The magnetic tape library device as claimed in claim 5, wherein the linear conversion mechanism is configured with a long hole formed along the supporting part, a guide pin provided to the front end abutting member and inserted through the long hole with being extended downward from the back face of the front end abutting member, and a guide groove formed on a bottom face of the cartridge housing body on the back side for guiding the guide pin.

7. The magnetic tape library device as claimed in claim 4, wherein the projection member is formed in a plain triangle shape and the engage face is arranged to be in parallel to the direction orthogonal to the inserting/extracting direction, and one side of the triangle is set as the guide face.

8. The magnetic tape library device comprising: a plurality of cartridge housing bodies for housing a plurality of magnetic tape cartridges inside thereof;

a device main body for housing the cartridge housing bodies within a same plane in a freely movable manner and in series in an inserting/extracting direction from an inserting/extracting slot;

connecting means for enabling the plurality of cartridge housing bodies to be connected with each other so as to cause the connected cartridge housing bodies to move together in unison in the inserting/extracting direction or to be released by a releasing operation from outside the magnetic tape library device; and locking means for enabling at least the cartridge housing body on the back side of the inserting/extracting direction of the device main body, among the plurality of cartridge housing bodies, to be locked to as to prevent the cartridge housing body on the back side from being released from the device main body or to be released from a locked state at the inserting/extracting slot side, wherein the lock mechanism includes an operation mechanism unit that operates to release the locked state of the cartridge housing body, wherein the operation mechanism unit includes a rotating lever part provided at one side face in a width direction of the cartridge housing body, and wherein the rotating lever part releases the locked state of the device main body and the cartridge housing body with a force applied from outside the magnetic tape library device.

\* \* \* \* \*